(12) United States Patent
Blinnikka

(10) Patent No.: US 8,045,802 B2
(45) Date of Patent: Oct. 25, 2011

(54) END OF PROGRAM PATTERN DETECTOR

(75) Inventor: Tomi Blinnikka, Berkeley, CA (US)

(73) Assignee: YAHOO! Inc., Sunnyvale, CA (US)

( * ) Notice: Subject to any disclaimer, the term of this patent is extended or adjusted under 35 U.S.C. 154(b) by 1332 days.

(21) Appl. No.: 11/566,032

(22) Filed: Dec. 1, 2006

(65) Prior Publication Data

US 2008/0134251 A1   Jun. 5, 2008

(51) Int. Cl.
*G06K 9/00*   (2006.01)
(52) U.S. Cl. ........ 382/181; 382/232; 382/176; 382/173; 382/190; 725/58; 725/112

(58) Field of Classification Search ............... 382/181, 382/232, 176, 173, 190; 725/58, 112, 135, 725/109
See application file for complete search history.

(56) References Cited

U.S. PATENT DOCUMENTS

| 6,594,393 B1 * | 7/2003 | Minka et al. | 382/218 |
| 6,608,930 B1 * | 8/2003 | Agnihotri et al. | 382/176 |
| 2003/0177503 A1 * | 9/2003 | Sull et al. | 725/112 |

\* cited by examiner

*Primary Examiner* — Samir Ahmed
*Assistant Examiner* — Ruiping Li
(74) *Attorney, Agent, or Firm* — James J. DeCarlo; Greenberg Traurig, LLP

(57) ABSTRACT

Systems and methods are set forth for detecting an end of program pattern. More specifically, systems and methods are set forth for recognizing and acting upon sequential image data that contains an end of program pattern.

23 Claims, 3 Drawing Sheets

END OF PROGRAM PATTERN DETECTOR

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

Increasingly, digital video distribution systems are used to deliver video programming to end-users. Today, many digital video distribution systems (e.g., distribution systems that may utilize cable, satellite, cellular, fiber, Ethernet, and various other transmission technologies) distribute thousands, if not millions, of video programs per year. Typically, digital video distribution systems transmit video information in discrete chunks (e.g., packets) that may be assembled into video programming upon receipt by a user's digital video display device. To identify particular video information (i.e., a "program") associated with the discrete chunks, as well as to distinguish one program from another program, digital video distribution systems typically transmit a unique identifier (e.g., a program ID or PID). With the advent of digital video recording technology, devices such as digital video recorders (DVRs) regularly may use the unique identifier for displaying programs in an electronic program guide (EPG) and scheduling video recording events of a specific program. In addition to a unique program identifier, many digital video distribution systems also transmit and/or utilize time information associated with a program, including but not limited to a program start time, a program end time, the duration or length (e.g., in seconds) and/or the size (e.g., in bytes) of a program. DVRs and other digital video recording devices may use the time information to schedule recording events.

In many cases, however, the time information that is associated with a program may be imprecise. In some cases, a start time associated with a program may identify the start of a commercial advertisement (i.e., "commercial") that precedes the program, instead of the start time of the program itself. In other cases, a start time associated with a program may identify a time associated with an EPG (e.g., an hourly time) rather than the program itself. For example, in the case of an EPG displaying only hour-long program intervals, a start time may indicate that an EPG program begins at 9:00 pm although the program itself may not begin until 9:05 pm. In other cases, the actual duration of some programs (e.g., live programming) may extend beyond the scheduled duration of the program (e.g., as scheduled in an EPG). In other cases, programs that end earlier than their scheduled end time may include commercials or even a portion of a subsequent program prior to the next scheduled program start time.

When time information is imprecise, users wishing to start a program may become frustrated when the scheduled start time of a program or the start time of a recording of the program do not correspond to the actual start time of the program. For example, a user may become frustrated by having to watch commercials preceding a scheduled program and/or a last portion of a program preceding a scheduled program. As another example, a user may also become frustrated when a scheduled program lasts longer or shorter than its scheduled duration, and the user sees more or less of the program, respectively, than the user would like to see.

SUMMARY

Against this backdrop, systems and methods are set forth for detecting an end of program pattern. More specifically, systems and methods are set forth for recognizing and acting upon sequential image data that contains an end of program pattern.

In one aspect, the disclosure may be considered to describe a method for identifying the end of a video event. The method includes receiving a stream of sequenced images associated with a first video event, the first video event having at least a known start time. The method further includes detecting an end of program pattern in the stream of sequenced images associated with the first video event. The method yet further includes identifying an end time for the first video event based upon the detection of the end of program pattern.

In another aspect, the disclosure may be considered to describe a method for identifying the end of a video event. The method includes receiving a stream of sequenced images associated with a first video event, the first video event having at least a known start image. The method further includes detecting an end of program pattern in the stream of sequenced images associated with the first video event. The method yet further includes selecting an end image for the first video event based upon the detection of the end of program pattern.

In yet another aspect, the disclosure may be considered to describe a method for identifying the start of a video event. The method includes receiving a stream of sequenced images comprising a first sequence of images. The method further includes detecting an end of program pattern in the first sequence of images. The method also includes, based upon the detection of the end of program pattern, selecting a start image for the video event These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

In general, this disclosure, the figures, and the appended claims set forth systems and methods for detecting an end of program pattern that may reside, for example, in a video image or video. As set forth in this disclosure, the figures, and the appended claims, the unmodified terms "video imaging" and "video" will be used to refer generally to a form of imaging (i.e., a process by which a representation of an actual scene may be generated) that is time-variable such that it may represent the motion in a scene. In one embodiment, video may be comprised of a sequence of images (i.e., still pictures or frames that are taken at various subsequent intervals in time). In this embodiment, each frame may represent the distribution of light energy and wavelengths over a finite sized area. The points of light comprising a frame may be associated with an intensity value that represents a magnitude of light energy (e.g., a weighted sum of the energy of different light wavelengths).

In one embodiment, an imager such as a charge-coupled device ("CCD") (e.g., a device utilizing a metal-oxide semi-conductor ("MOS")) or an active pixel sensor ("APS") (e.g., a device utilizing a complementary metal-oxide semiconductor ("CMOS")) may be used to convert incident light into an electrical (video) signal. An imager typically converts light into an electronic signal through an elaborate electronic process. In one embodiment, a camera lens may project an image onto an imager surface that exposes a photosensitive array to light. In this embodiment, the photosensitive array may convert the light into an electrical charge. In one embodiment, at the end of a timed exposure, the imager may convert the accumulated charge into a continuous analog voltage at the imager's output terminals. In one embodiment, an analog-to-digital ("ADC") converter may digitize the analog waveform output by the imager into a discrete digital video signal representing a frame. In one embodiment, digitizing video may include partitioning each frame into a number of picture elements or pixels. Pixels are typically arranged in columns and rows. In one embodiment, each pixel may be represented by three binary numbers that may represent the brightness of the red, green, and blue color components within each pixel.

In one embodiment, a video comprises briefly displaying a frame on an image-rendering device for a short time (e.g., 1/24th, 1/25th or 1/30th of a second) and then replacing the frame with a subsequent frame. This process may then be repeated at a certain frame rate (e.g., 30 frames per second), corresponding to the length of time each frame is displayed. In this embodiment, a person's persistence of vision optimally blends the frames together, producing the illusion of a time-variable image or video.

Figure 1:
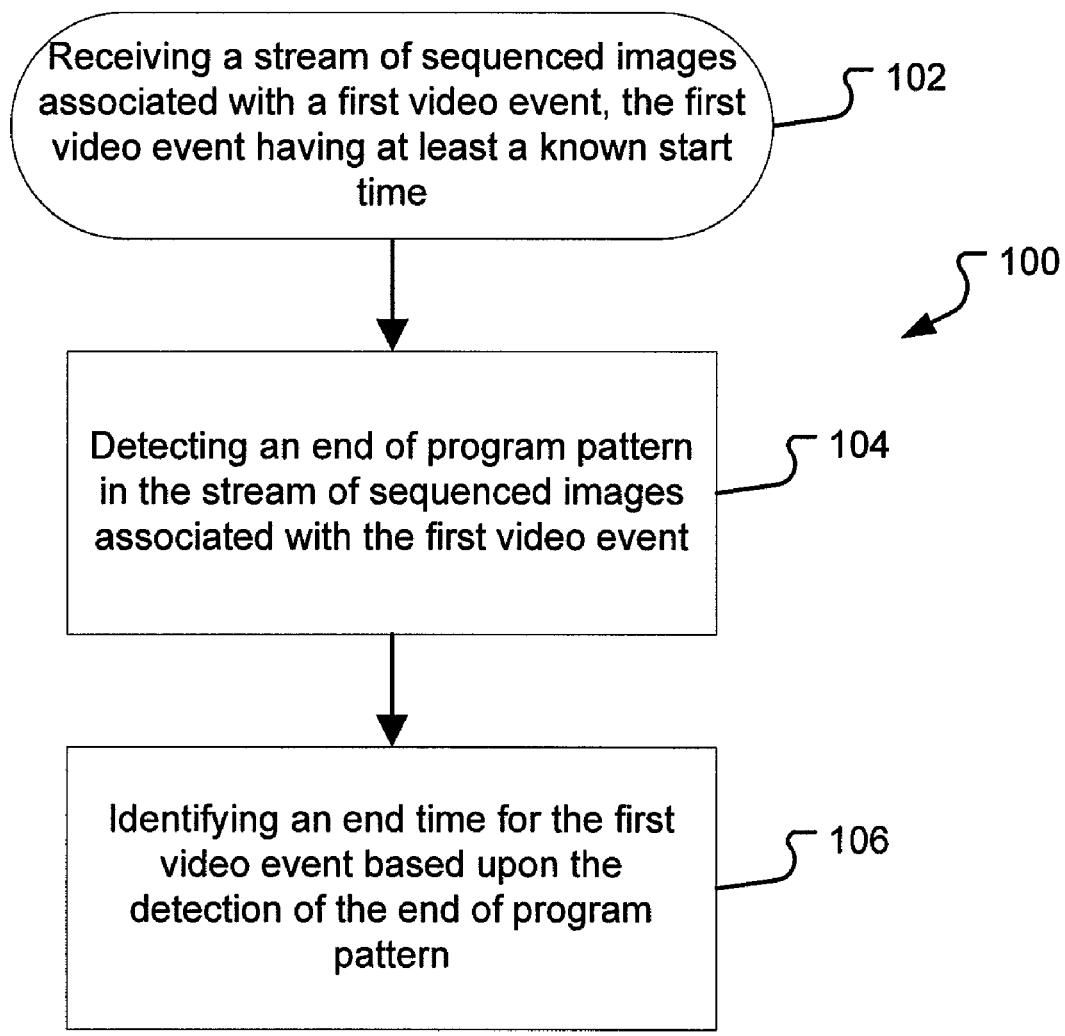
FIG. 1 is a flow chart of an embodiment of a method for identifying the end of a video event.

FIG. 1 is a flow chart of an embodiment of a method 100 for identifying the end of a video event. In one embodiment, a stream of sequenced images associated with a first video event having a known start time is received by a computing device in a receiving operation 102. In one embodiment, the computing device that receives the stream of sequenced images may reside at a user location. For example, the computing device that receives the stream of sequenced images may take the form of a digital video recorder ("DVR"). The computing device that receives the stream of sequenced images may also take many other forms, including but not limited to a set-top-box (e.g., a computing device that includes a cable or satellite television tuner), a personal computer, and a digital versatile disc ("DVD") player. In one embodiment, a DVR may be comprised of one or more processors and associated components that receive the stream of sequenced images. In one embodiment, the stream of sequenced images may take the form of compressed video, such as Motion Picture Experts Group ("MPEG")-2 video. In this embodiment, the stream of sequenced images may be comprised of an MPEG-2 video stream recorded to a hard disk drive ("HDD"). In another embodiment, the stream of sequenced images may be comprised of an MPEG-2 video signal that is extracted from a digital cable or satellite signal (e.g., a Digital Video Broadcasting ("DVB") signal).

In another embodiment, the computing device that receives the stream of sequenced images may reside at a remote location. For example, the computing device that receives the stream of sequenced images may take the form of one or more remote computing devices, including but not limited to networked computing devices and storage devices.

In one embodiment, a first video event comprises a set of packets that contain video information and that may share a unique program identifier (e.g., a PID). In one embodiment, the packets may be received sequentially. For example, the one or more processors and associated components of a DVR may receive packets associated with a video program in a sequential order that permits playback of a video program without reordering the packets. In another embodiment, the packets may be received non-sequentially. For example, the one or more processors and associated components of a DVR may receive packets for a plurality of programs that are not ordered for playback (e.g., packets retrieved from a HDD may not be retrieved in sequential order due to an HDD disk read algorithm that may minimize movement of a HDD read head). In this example, the DVR may buffer the packets and use a processor and/or memory component to reassemble the packets corresponding to a particular PID into a sequential order. In one embodiment, the start time of a video event may be the time the video event is received. In another embodiment, the start time of a video event may expressed as the time relative to the display, utilization or other use of a first PID associated with a video event. In yet another embodiment, the start time of a video event may be expressed as a range of time within which the video event will begin. For example, in the case of live programming that may not begin at a predictable time, a digital video distribution system may indicate that a video event will begin within a certain range of time.

In one embodiment, a first video event may be comprised of a set of packets that contain video information associated with more than one program. For example, despite sharing a unique PID, the first video event may include packets that contain video information of a preceding program (e.g., the ending credits of the preceding program or the commercials following the preceding program) or video information of a subsequent program (e.g., the title screen and/or first few minutes of the program following the program associated with the shared PID). As a more specific example, a digital video distribution system may assign a unique shared PID solely on a program-by-program basis (e.g., packets associated with an episode of the sitcom "Seinfeld" may share a unique PID). In this example, the digital video distribution system typically does not include a separate PID for commercials. Thus, in this example, the packets containing video information associated with the commercials following the program (e.g., the episode of "Seinfeld") may also share the same PID as those packets containing the video information associated with the program itself.

In one embodiment, the stream of sequenced images associated with the first video event may be monitored to detect a first end of program pattern. In one embodiment, monitoring may comprise one or more processes running on the one or more processors and associated components of a DVR. For example, as a stream of sequenced image data is received from an MPEG decoder within the DVR, a monitoring process may monitor the sequenced image data on a frame-by-frame basis. In this example, the monitoring process may compare the sequenced image data against a predetermined pattern that corresponds to an end of program pattern. One skilled in the art will recognize that monitoring may utilize many forms of hardware, software, or combinations or permutations thereof, all of which are within the scope of this disclosure. As another example, a monitoring process may monitor sequenced image data that is compressed. For instance, where sequenced image data compressed according to the MPEG-2 specification is monitored, a monitoring process may monitor sequential image data that is received out of sequence in a compressed form (e.g., monitoring may include comparison of sequential image data that may be compressed out of sequence within I-frames, P-frames, and/or B-frames).

Detection of an end of program pattern in a detecting operation 104 may take many forms. In one embodiment, an end of program pattern may be comprised of one or more images with a common attribute. For example, an end of program pattern may be detected in a detecting operation 104 where a comparison of sequential image data results in a determination that at least a portion of a stream of sequential images (e.g., at least one or more frames) displays an unchanging background (e.g., a uniformly colored background, such as a black background) and text (e.g., colored text, such as white text) that changes position (e.g., text that scrolls vertically, fades in, and/or fades out) from image to image. As another example, an end of program pattern may be detected in a detecting operation 104 where a comparison of sequential image data results in a determination that at least a portion of a stream of sequential images displays text that changes position at a certain or changing rate. As yet another example, an end of program pattern may be detected in a detecting operation 104 where a comparison of sequential image data results in a determination that at least a portion of a stream of sequential images displays certain keywords, including but not limited to words such as "Copyright," "The End," "Producer," or "Key Grip." As yet another example, an end of program pattern may be detected in a detecting operation 106 where a comparison of sequential image data results in a determination that at least a portion of a stream of sequential images displays a graphic or animation, including but not limited to an animation such as a roaring lion (e.g., Metro-Goldwyn-Mayer, Inc.'s "Leo the Lion").

One skilled in the art will recognize that many ways of detecting patterns, including but not limited to text, are possible and within the scope of this disclosure. For example, a process of optical character recognition ("OCR") may be utilized to detect text within a frame. As another example, as in the case where scrolling end credits of a program occupy a portion of any given frame, a pattern may be detected by comparing certain regions of a frame to certain regions of another frame. To illustrate this example, a pattern of scrolling text may be detected in an upper region of a frame that also displays commercial advertising or a news ticker in the lower region of the frame.

In one embodiment, based upon detection of an end of program pattern, an end time for a first video event is identified in an identifying operation 106. In one embodiment, the end time identified in identifying operation 106 is the time following the end of program pattern detected in the first video event. For example, where an end of program pattern comprises several minutes of scrolling text (e.g., the ending credits of a movie), the end time for a first video event may be the time whereupon the scrolling text ends. In another embodiment, where the end of program pattern again comprises several minutes of scrolling text, the end time may be the time at which an image following the scrolling text is displayed. One skilled in the art will recognize that many configurations for identifying an end time are possible, including but not limited to identifying an end time that is a certain time or a certain number of frames away from the detection or end of an end of program pattern, identifying an end time coinciding with a certain frame following an end of program pattern (e.g., an I-frame), and identifying the time that the end of program pattern is detected. One skilled in the art will also recognize that the end time may comprise a time corresponding to a clock time (e.g., based upon Eastern Standard Time) or a time relative to the start time of the video event (e.g., an end time relative to the start time may permit measurement of a duration or file size of the video event).

In one embodiment, in response to a record request that identifies a first video event, the first video event may be stored on a storage device. For example, upon detection of an end of program pattern, a computing device may store the stream of sequenced images that was received prior to the detection. In this example, the first video event that is stored may not include the video information (e.g., commercials following the program that are associated with the program's PID) following detection of the end of program pattern. In another example, upon no longer detecting an end of program pattern, a computing device may store the stream of sequenced images that was received prior to and including the end of program pattern. In this example, the first video event that is stored may include all of the ending credits of a given program, but not the commercials following the program). In yet another example, upon detection of an end of program pattern, a computing device may display a sequence of images associated with a second video event. For example, upon the detection of an end of program pattern, a second program (e.g., a second program queued for display) may be displayed. As another example, upon the detection of an end of program pattern, a commercial or advertisement may be displayed in place of, or in addition to, the display of the first video event. One skilled in the art will recognize that many other events may be triggered upon detection of the end of program pattern, including but not limited to the display of certain other video events.

In another embodiment, a second end of program pattern may be detected in the first video event during a detecting operation. For example, a first video event may be comprised of one or more packets that, notwithstanding a shared PID, are associated with a program that precedes or follows the program associated with the PID. For example, a first video event may include packets containing video information associated with a preceding program (e.g., the end credits of a preceding program). In this example, a first end of program pattern may correspond to the ending credits associated with the preceding program, and the second end of program pattern may correspond to the ending credits of the program associated with the PID. Thus, for example, upon detection of a second end of program pattern, the part of a first video event prior to and/or including the first end of program pattern could be deleted or trimmed from a recording of the first video event.

In one embodiment, the stream of sequenced images may be buffered. In one embodiment, buffering may utilize one or more memory components (e.g., non-volatile or volatile memory, such as a HDD and/or DDR-SDRAM). For example, buffering a stream of sequenced images may utilize one or more memory components to permit background monitoring and detection of an end of program pattern. In one embodiment, buffering the stream of sequences images may permit background processing and/or processing of multiple streams of sequential image data in parallel.

In one embodiment, sequential image data may comprise a portion of video information representing a stream of sequenced images. For example, one or more processors and associated components of a computing device may receive a subset of image data from a stream of sequential images that includes, but is not limited to, image data from a certain portion of an image. For instance, in a stream of sequential images displaying a football game program, a computing device may receive only that portion of the image (e.g., a lower-right portion) where an end of program pattern (e.g., a ticker displaying end of program credits) may be likely to appear. As another example, in a stream of sequential images displaying a movie program, a computing device may receive only that portion of the image (e.g., a corner portion) where an end of program pattern (e.g., an unchanging black background) may be likely to appear.

In one embodiment, an end of program signal may be transmitted to a computing device. One skilled in the art will recognize that transmission of an end of program signal may take many forms that are within the scope of this disclosure. For example, transmission of an end of program signal may comprise generating a signal that triggers an event (e.g., the storage of the first video event) within a first computing device and/or a second computing device. As a further example, transmission of an end of program signal may comprise generating a signal in the form of a notification to a user (e.g., a graphical warning that the end of a program is detected or a graphical notification of an identified end time).

Figure 2:
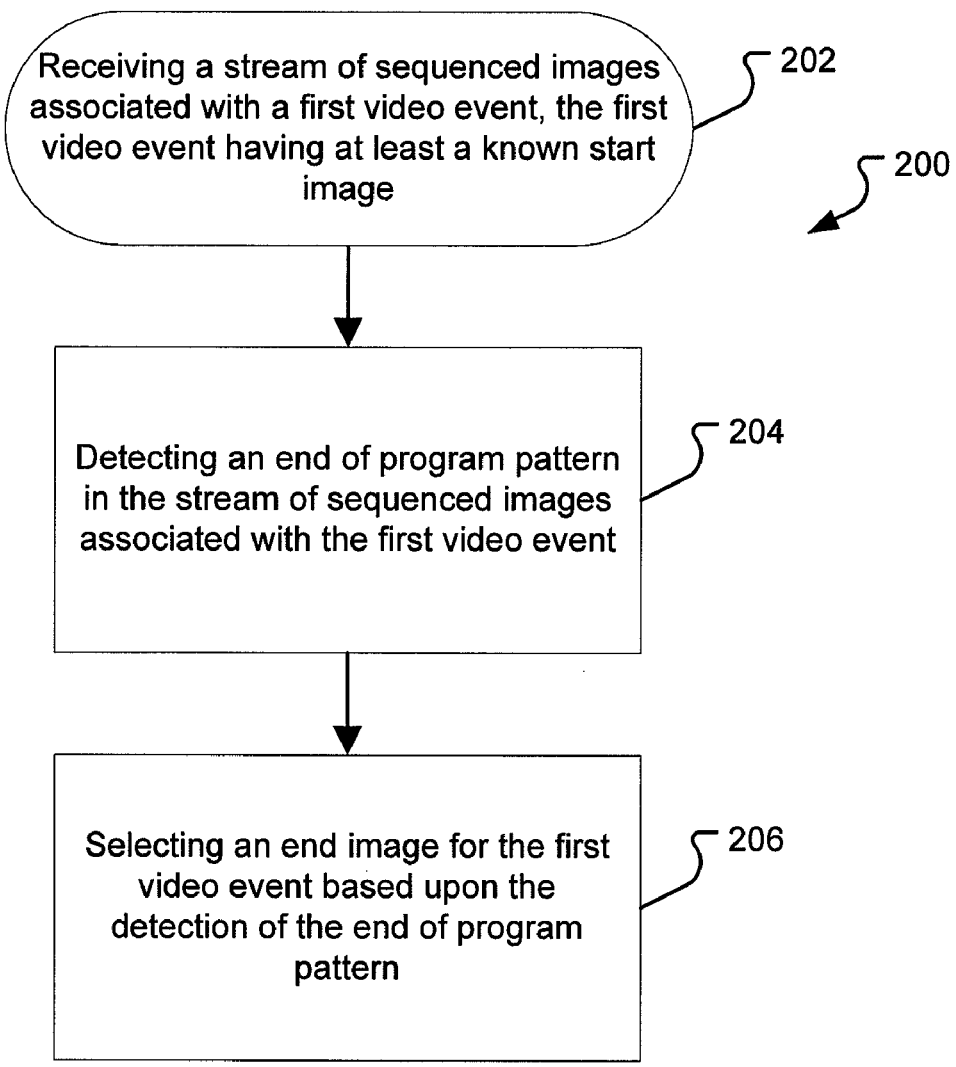
FIG. 2 is a flow chart of an embodiment of a method for identifying the end of a video event.

FIG. 2 is a flow chart of an embodiment of a method 200 for identifying the end of a video event. In one embodiment, as similarly discussed above, a stream of sequenced images associated with a first video event having a known start image is received by a computing device in a receiving operation 202. In one embodiment, the start image of a video event may be the image corresponding to the first packet or packets associated with a program's PID. In another embodiment, the start image of a video event may represent only a portion of an image. For example, a start image may be one or more P-frames or B-frames that together may further require video information from an I-frame in order to display an image of video. One skilled in the art will recognize that many ways of determining a start image are possible and within the scope of this disclosure. In an embodiment, as discussed above, an end of program pattern may be detected in the stream of sequenced images associated with the first video event in a detecting operation 204.

In one embodiment, as similarly discussed above and based upon the detection of an end of program pattern, an end image may be selected for the first video event in a selecting operation 206. In one embodiment, the end image selected in selecting operation 206 is the image following the end of program pattern detected in the first video event. For example, where an end of program pattern comprises several minutes of scrolling text (e.g., the ending credits of a movie), the end image for a first video event may be the first image (e.g., I-frame) following the ending of the scrolling text. One skilled in the art will recognize that many configurations for selecting an end image are possible, including but not limited to selecting an end image that is a certain time or a certain number of frames away from the detection or end of an end of program pattern, selecting an end image coinciding with a certain frame following an end of program pattern (e.g., an I-frame), and selecting the image shown at the time that the end of program pattern is detected. One skilled in the art will also recognize that the end image may be associated with a time corresponding to a clock time (e.g., based upon Eastern Standard Time) or a time relative to the start image of the video event (e.g., an end image relative to the start image may permit measurement of a duration, number of frames, or file size of the video event).

Figure 3:
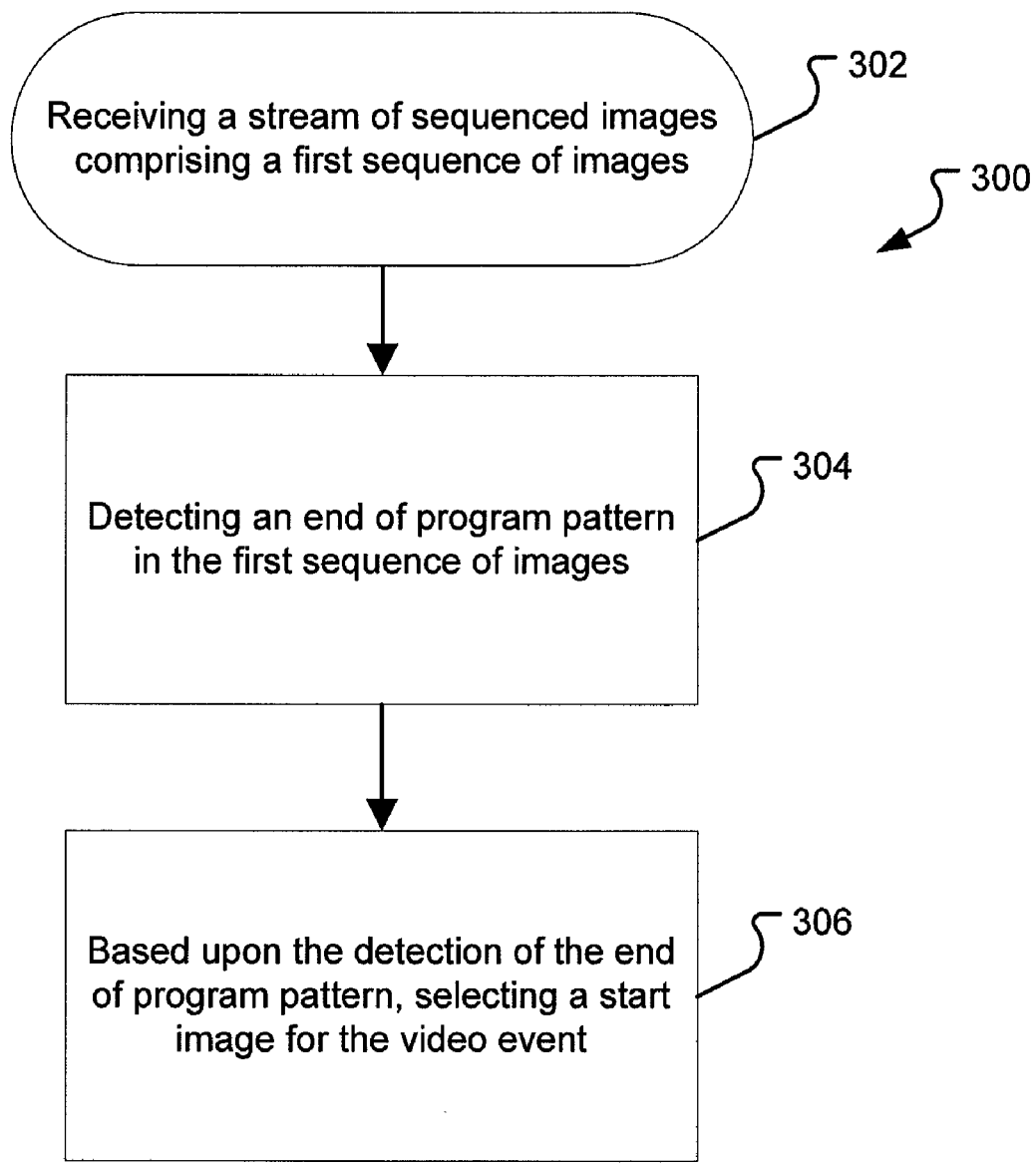
FIG. 3 is a flow chart of an embodiment of a method for identifying the start of a video event.

FIG. 3 is a flow chart of an embodiment of a method 300 for identifying the start of a video event. In one embodiment, as similarly discussed above, a stream of sequenced images comprising a first sequence of images is received by a computing device in a receiving operation 302. In one embodiment, the stream of sequenced images includes at least an end of program pattern and a selectable start image for a video event. In an embodiment, as discussed above, an end of program pattern may be detected in a first sequence of images of the stream of sequenced images in a detecting operation 304. For example, an end of program pattern, as discussed above, comprising scrolling text at the end of a movie may be detected within a certain number of frames or time from the beginning of a stream of sequenced images. In this example, despite sharing the PID, the scrolling text may be the end credits of the show preceding the program associated with a certain PID.

In one embodiment, as similarly discussed above and based upon the detection of an end of program pattern, a start image may be selected for a video event in a selecting operation 306. In one embodiment, the start image selected in selecting operation 306 is the image following the end of program pattern detected in the first sequence of images. For example, where an end of program pattern comprises several minutes of scrolling text (e.g., the ending credits of a movie), the start image for a video event may be the first image (e.g., I-frame) following the ending of the scrolling text. One skilled in the art will recognize that many configurations for selecting a start image are possible, including but not limited to selecting a start image that is a certain time or a certain number of frames away from the detection or end of an end of program pattern, selecting an start image coinciding with a certain frame following an end of program pattern (e.g., an I-frame), and selecting the image shown at the time that the end of program pattern is detected.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, the detection of an end of program pattern may be utilized for the importation and conversion of analog video information into digital form. Detecting an end of program pattern may also be utilized for segmenting video information into chapters or other logical units, or creating metadata specifying the segments.

Numerous other changes may be made which will readily suggest themselves to those skilled in the art and which are encompassed in the spirit of the invention disclosed and as defined in the appended claims.

What is claimed is:

1. A method comprising:
receiving, at a computing device, a stream of sequenced images comprising a first sequence of images;
detecting, via the computing device, an end of program pattern in the first sequence of images, said detecting comprising comparing the first sequence of images against a predetermined pattern, wherein the predetermined pattern corresponds to the received stream, wherein the end of program pattern comprises at least a portion of the stream of sequenced images and vertically scrolling text, wherein the vertically scrolling text scrolls at a first constant rate; and
based upon the detection of the end of program pattern, selecting, via the computing device, a start image for a video event.

2. The method of claim 1 wherein the start image is part of the first sequence of images.

3. The method of claim 1 further comprising:
receiving a record request, the record request identifying the video event; and
storing the video event on a storage device, the stored video event beginning at the start image.

4. The method of claim 3 wherein the start image is the image following the end of program pattern.

5. The method of claim 1 wherein the start image is the image following the end of program pattern.

6. The method of claim 1 wherein the start image is an image that is a predetermined number of images following the end of program pattern.

7. The method of claim 1 wherein the start image is an image that is a predetermined time after the end of program pattern.

8. The method of claim 1 wherein the stream of sequenced images further comprises a second sequence of images.

9. The method of claim 8 wherein the start image is part of the second sequence of images.

10. The method of claim 8 further comprising:
selecting an end image for the video event in the second sequence of images.

11. The method of claim 1 wherein the vertically scrolling text is colored white.

12. The method of claim 1 wherein the vertically scrolling text is displayed against an unchanging background.

13. The method of claim 12 wherein the unchanging background is colored black.

14. The method of claim 1 wherein the vertically scrolling text is accelerated from the first constant rate to scroll at a second constant rate.

15. The method of claim 1 wherein the end of program pattern includes fading text.

16. The method of claim 15 wherein the fading text is colored white.

17. The method of claim 15 wherein the fading text is displayed against an unchanging background.

18. The method of claim 17 wherein the unchanging background is colored black.

19. The method of claim 15 wherein the fading text fades at a first constant rate.

20. The method of claim 19 wherein the fading text is accelerated from the first constant rate to scroll at a second constant rate.

21. The method of claim 1 wherein the end of program pattern includes a keyword, phrase, graphic, or animation.

22. The method of claim 1 wherein the start image differs from a predetermined start image of the first video event.

23. The method of claim 1 further comprising:
upon identification of the start image, notifying a user of the start image.

* * * * *